US009671308B2

(12) United States Patent
Wang et al.

(10) Patent No.: US 9,671,308 B2
(45) Date of Patent: Jun. 6, 2017

(54) METHOD FOR HELIUM MASS SPECTROMETRIC FINE-LEAK TEST BASED ON QUANTITATIVE DETERMINATION OF MAXIMUM TEST-WAITING TIME

(71) Applicant: Beijing Keytone Electronic Relay Corporation Ltd., Beijing (CN)

(72) Inventors: Genglin Wang, Beijing (CN); Fei Li, Beijing (CN); Caiyi Wang, Beijing (CN); Ningbo Li, Beijing (CN); Liyan Wang, Beijing (CN); Lijun Dong, Beijing (CN); Yongmin Liu, Beijing (CN)

(73) Assignee: BEIJING KEYTON ELECTRONIC RELAY CORPORATION LTD., Beijing (CN)

( * ) Notice: Subject to any disclaimer, the term of this patent is extended or adjusted under 35 U.S.C. 154(b) by 973 days.

(21) Appl. No.: 13/923,658

(22) Filed: Jun. 21, 2013

(65) Prior Publication Data

US 2014/0222353 A1    Aug. 7, 2014

(30) Foreign Application Priority Data

Feb. 6, 2013 (CN) .......................... 2013 1 0047094

(51) Int. Cl.
*G01M 3/22* (2006.01)
(52) U.S. Cl.
CPC .................................. *G01M 3/229* (2013.01)

(58) Field of Classification Search
CPC .......... G01M 3/00; G01M 3/007; G01M 3/02; G01M 3/20; G01M 3/202; G01M 3/26; H01J 49/0027; H01J 49/0031; H01J 49/0036
See application file for complete search history.

(56) References Cited

U.S. PATENT DOCUMENTS 5,625,141 A * 4/1997 Mahoney .............. G01M 3/202
73/40.7

OTHER PUBLICATIONS

Wang Geng-lin et al., "Study on Leak Rate Formula and Criterion for Helium Mass Spectrometer Fine Leak Test", IEEE (2007).*
(Continued)

*Primary Examiner* — Mohamed Charioui
*Assistant Examiner* — Catherine Rastovski
(74) *Attorney, Agent, or Firm* — Faegre Baker Daniels LLP

(57) ABSTRACT

A method for helium mass spectrometric fine-leak test is based on quantitative determination of maximum test-waiting time, which gives a method for quantitative determination of the maximum test-waiting time for fine-leak test during a helium mass spectrometric test process of the sealability, and gives a method for determining the criterion for measured leak rate by taking the minimum helium gas exchange time constant, i.e., a rigour grade $\tau_{Hemin}$, of an acceptable sealed electronic component as a basic criterion for helium mass spectrometric fine-leak test. Based on the inventive method for quantitative determination of the maximum test-waiting time, for most of the cavity volume ranges, the maximum test-waiting time that is determined accurately may be much longer than 1 hour or 0.5 hour as determined qualitatively by the existing related standards.

8 Claims, 3 Drawing Sheets

(56) References Cited

OTHER PUBLICATIONS

United States of America Department of Defense. "Department of Defense Test Method Standard: Environmental Test Methods for Semiconductor Devices: Part 1: Test Methods 1000 through 1999 MIL-STD-750-1," Jan. 3, 2012, 167 pages.

United States of America Department of Defense. "Department of Defense Test Method Standard: Microcircuits MIL-STD-883J," Jun. 7, 2013, 755 pages.

United States of America Department of Defense. "Department of Defense Test Method Standard: Test Methods for Semiconductor Devices MIL-STD-750F," Jan. 3, 2012, 19 pages.

* cited by examiner

US 9,671,308 B2

METHOD FOR HELIUM MASS SPECTROMETRIC FINE-LEAK TEST BASED ON QUANTITATIVE DETERMINATION OF MAXIMUM TEST-WAITING TIME

CROSS-REFERENCE TO RELATED APPLICATION

This application claims priority to Chinese Application No. 201310047094.3, filed Feb. 6, 2013, which is herein incorporated by reference in its entirety.

TECHNICAL FIELD

The present invention relates to the field of helium mass spectrometric fine-leak test of the sealability of a sealed electronic component, and in particular, to a method for helium mass spectrometric fine-leak test based on quantitative determination of the maximum test-waiting time.

BACKGROUND

The helium mass spectrometric fine-leak test is one of the most commonly used methods for detecting the sealability of a sealed electronic component, and may be based on a helium pressurizing method or a helium prefilling method.

So far, in China National Standard, China National Military Standard, IEEE and American Military Standard for helium mass spectrometric fine-leak test, including MIL-STD-750F/750-1 and draft amendments MIL-STD-883J published in USA in recent years, the basic criterion employed for a sealability test method is often an equivalent air standard leak rate L, which may be adjusted for different cavity volumes. For example, in the second draft amendment MIL-STD-883J published in September 2012, the sealability test requirements are divided into nonspace-level requirements and space-level requirements from a small cavity volume to a large cavity volume, where the space-level basic criterion L is from $1 \times 10^{-4}$ Pa·cm$^3$/s to $1 \times 10^{-3}$ Pa·cm$^3$/s, and the minimum helium gas exchange time constant, i.e., a rigour grade $\tau_{Hemin}$, corresponding to the basic criterion L and the criterion $R_1$ for measured leak rate is from 43 days to 8600 days, which differs by about 200 times; under the same environmental condition, the reliable storage life with an internal water vapor content no larger than 5000 ppm also differs by about 200 times; thus, $\tau_{Hemin}$ and the reliable storage life are rather unbalanced. More notably, the maximum test-waiting time in the fixed scheme of such standard helium pressurizing methods is often qualitatively determined as "1 hour or 0.5 hour" and "1 hour"; when such standards are applied to a helium prefilling method, the maximum test-waiting time is determined as "immediately", "0.5 hour" or "1 hour". For a small component under test with a cavity volume less than 0.002 cm$^3$ or less than 0.006 cm$^3$, the corresponding test-waiting time is 0.5 hour or 1 hour, and a component under test with a large leak will be undetected. For compoments under test with a common cavity volume range, it is difficult or unable to lower the leak rate of surficially absorbed helium of the components to the low background leak rate level required for high-rigour grade sealability test during the maximum test-waiting time of 0.5 hour or 1 hour, and during batch tests, it is difficult to control a further background leak rate, i.e., leak detector background, thus limiting the number of components that can be detected in the same batch; thus, the operability when the criterion is made stricter in the above standards and the latest draft amendment thereof becomes problematic. Therefore, for the purpose of stricter criterion for measured leak rate with respect to sealability, classifying the sealability, extending and balancing the reliable storage life of a sealed electronic component, it becomes a key point to improve the basic criterion for helium mass spectrometric fine-leak test, especially to improve the method for determining the maximum test-waiting time and effectively lengthen the maximum test-waiting time.

In the prior art, it was put forward in 2009 to take $\tau_{He}$ as a rigour grade, but the more precise rigour grade $\tau_{Hemin}$ has not been introduced; approximate formula for calculating the maximum test-waiting time based on a pressurizing method and the maximum test-waiting time based on a filling method have been put forward, but the method for determining the maximum test-waiting time was not explicit. And an apparent difference exists between the connotation as well as the expression of the approximate formula of the maximum test-waiting time and those of the present accurate formula; when the maximum test-waiting time exceeds (1/10) $\tau_{Hemin}$, the difference becomes greater, and an undue limitation is laid on the cavity volume range applicable to the formula of the maximum test-waiting time. In some standards, a storage method is employed, where the atmospheric pressure in storage environment is $P_0$, but the partial pressure of the helium gas is specified as 0.1$P_0$; as a result, the judging result is changed in many cases.

Based on the above description, during the helium mass spectrometric fine-leak test of the sealability of a sealed electronic component, it is necessary to accurately determine the maximum test-waiting time, quantitatively determine the maximum test-waiting time and effectively lengthen the total time for storage and test waiting; moreover, it is necessary to improve the basic criterion for fine-leak test and the method for determining the criterion for measured leak rate.

SUMMARY

Therefore, it is an object of the present invention to provide a method for helium mass spectrometric fine-leak test based on quantitative determination of the maximum test-waiting time, in which the maximum test-waiting time is quantitatively determined, thereby effectively lengthening the total time for storage and test waiting, and determining the criterion for measured leak rate by taking the minimum helium gas exchange time constant, i.e., a rigour grade $\tau_{Hemin}$, of an acceptable component under test as a basic criterion, so that the criterion for measured leak rate with respect to sealability can be made stricter, the sealability can be hierarchized, and the reliable storage life of a sealed electronic component can be extended and balanced.

To solve the above technical problem, the invention employs the following technical solutions.

A method for helium mass spectrometric fine-leak test based on quantitative determination of the maximum test-waiting time, comprising Step S41 of judging, by a judging unit, whether test-waiting time in which a component under test waits for test in the air is no longer than the maximum test-waiting time $t_{max}$ determined quantitatively, preferably the maximum test-waiting time $t_{max}$ is obtained in Step S41 as test-waiting time in which a measured leak rate R of a sealed component with a fixed cavity volume that is subjected to predefined pressure of pressurizing helium for predefined time or with a predefined ratio of prefilled helium in conditions of $L=L_0$ and $\tau_{He}=\tau_{He0}$ is attenuated to a criterion $R_{max}$ for measured leak rate in a condition of $\tau_{He}=\tau_{Hemin}$ for the sealed component; where L denotes an equivalent standard leak rate, $L_0$ denotes the minimum detectable leak rate of gross-leak test, $\tau_{He}$ denotes a helium gas exchange time constant, $\tau_{Hemin}$ denotes the minimum helium gas exchange time constant of an acceptable sealed component, i.e., a rigour grade, and $\tau_{He0}$ denotes a helium gas exchange time constant for gross leak, $$\tau_{He0} = \frac{VP_0}{L_0}\sqrt{\frac{M_{He}}{M_A}}$$

Where, V denotes the cavity volume of a component under test, $P_0$ denotes standard atmospheric pressure, $M_{He}$ denotes the molecular weight of helium gas in grams, and $M_A$ denotes the mean molecular weight of air in grams.

Preferably, in Step S41, a flexible scheme or a fixed scheme of helium mass spectrometric fine-leak test based on a helium-pressurizing method is employed, and the maximum test-waiting time $t_{max}$ is $t_{2max}$; if $\tau_{Hemin} > \tau_{He0}$, $t_{2max}$ is obtained by formula (1):

$$t_{2max} = \frac{\tau_{Hemin}\tau_{He0}}{\tau_{Hemin} - \tau_{He0}}\left\{\ln\left(\frac{\tau_{Hemin}}{\tau_{He0}}\right) + \ln\left[\frac{1-\exp\left(-\frac{t_1}{\tau_{He0}}\right)}{1-\exp\left(-\frac{t_1}{\tau_{Hemin}}\right)}\right]\right\} \quad (1)$$

Where, $t_1$ denotes the time for applying pressurized helium on the component under test in a helium pressurizing tank;

In the case of the fixed scheme of the helium pressurizing method, $t_{2max}$ conforms to formula (2):

$$t_{2max} \leq \tfrac{1}{10}\tau_{Hemin} \quad (2)$$

And, a group of values of $t_{2max}$ for the fixed scheme of the helium pressurizing method is obtained via formula (1) and (2), as shown in Table 2.

In Step S41, if a flexible scheme or a fixed scheme of helium mass spectrometric fine-leak test based on the helium-prefilling method is employed, and the maximum test-waiting time $t_{max}$ is $t_{3max}$; if $\tau_{Hemin} > \tau_{He0}$, $t_{3max}$ is obtained by formula (3):

$$t_{3max} = \frac{\tau_{Hemin}\tau_{He0}}{\tau_{Hemin} - \tau_{He0}}\ln\left(\frac{\tau_{Hemin}}{\tau_{He0}}\right) \quad (3)$$

When the fixed scheme of the helium prefilling method is employed, $t_{3max}$ conforms to formula (4):

$$t_{3max} \leq \tfrac{1}{10}\tau_{Hemin} \quad (4)$$

And, a group of values of $t_{3max}$ for the fixed scheme of the helium prefilling method is obtained via formula (3) and (4), as shown in Table 4.

Preferably, in Step S2, a storage method that can effectively lengthen the total time for storage and test waiting is employed, and the storage method includes the following steps:

For the helium pressurizing method, the component under test is put into a helium pressurizing tank which is then vacuumed, and after the helium pressurizing tank is applied by a pressure $P_E$ of pressurizing helium for time $t_1$, partial components waiting for test are stored in a helium pressurizing tank or a storage tank with a total pressure of (1+10%) $P_0$ and a partial pressure of helium gas of (1+10%) $P_E t_1/$ $\tau_{Hemin}$ for storage time not exceeding a rigour grade $\tau_{Hemin}$, and the maximum test-waiting time $t_{2max}$ starts from the ending of the storage and takes a value of $t_{3max}$ calculated according to formula (3);

For the helium prefilling method, a gas mixture of a pressure of $(1.05\sim1.10)P_0$ is filled into the sealed component under test according to a determined ratio of prefilled helium k, partial components waiting for test are stored in a helium prefilling device or a storage tank with an atmosphere the same as the prefilled gas mixture including helium for storage time not exceeding the rigour grade $\tau_{Hemin}$, where k denotes a ratio of the partial pressure of helium gas in the prefilled gas mixture of nitrogen and helium to $P_0$; and the maximum test-waiting time $t_{3max}$ starts from the ending of the storage and is calculated according to formula (3).

The inventive method includes Step S44 including: judging, by a judging unit, whether the sealability of the component under test is acceptable according to the measured leak rate R; where the judging Step S44 comprises steps as following:

Step S441: judging, by the judging unit, whether the measured leak rate R of the component under test is larger than the criterion $R_{max}$ for measured leak rate; when the measured leak rate R is larger than the criterion $R_{max}$, the sealability of the component under test is judged as failed; and when the measured leak rate R of the component under test is equal to or less than the criterion $R_{max}$, Step S442 is performed;

Step S442: carrying out a gross-leak test with the minimum detectable leak rate $L_0$ of 1.0 Pa·cm$^3$/s; if the component does not pass the gross-leak test, the sealability of the component under test is judged as failed; and if the component passes the gross-leak test, the sealability of the component under test is judged as acceptable.

Preferably, in Step S441, the rigour grade $\tau_{Hemin}$ is taken as a basic criterion for helium mass spectrometric fine-leak test, and the criterion $R_{max}$ for measured leak rate is calculated from $\tau_{Hemin}$;

When helium mass spectrometric fine-leak test based on the helium-pressurizing method is employed, R is substituted by $R_1$, and $R_{max}$ is substituted by $R_{1max}$; for the fixed scheme of the helium pressurizing method, $R_{1max}$ is obtained by formula (5) in conditions of $t_1 \leq (1/5)\tau_{Hemin}$ and $t_1 \leq t_{2max}$, $$R_{1max} = \frac{VP_E t_1}{\tau_{Hemin}^2} \quad (5)$$

Where, V denotes the minimum cavity volume in a cavity volume segment of the fixed scheme, and a group of values of $R_{1max}$ for the fixed scheme of the helium pressurizing method is obtained via formula (5), as shown in Table 1.

For the flexible scheme of the helium pressurizing method, $R_{1max}$ is obtained via formula (6):

$$R_{1max} = \frac{VP_E}{\tau_{Hemin}}\left[1-\exp\left(-\frac{t_1}{\tau_{Hemin}}\right)\right]\exp\left(-\frac{t_2}{\tau_{Hemin}}\right) \quad (6)$$

Where, V denotes the cavity volume of the component under test, $t_2$ denotes the actual test-waiting time but is no longer than $t_{2max}$ specified in formula (1); for a component that is stored for test, $t_2$ is no longer than $t_{3max}$ specified in formula (3).

When helium mass spectrometric fine-leak test based on the helium-prefilling method is employed, R is substituted by $R_2$ and $R_{max}$ is substituted by $R_{2max}$; for the fixed scheme of the helium prefilling method, $R_{2max}$ is obtained via formula (7) in a condition of $t_3 \leq t_{3max}$, $$R_{2max} = \frac{VkP_0}{\tau_{Hemin}} \quad (7)$$

Where, V denotes the minimum cavity volume in the cavity volume section of the fixed scheme, and a group of values of $R_{2max}$ for the fixed scheme of the helium prefilling method is obtained via formula (7), as shown in Table 3.

For the flexible scheme of the helium prefilling method, $R_{2max}$ is obtained via formula (8):

$$R_{2max} = \frac{VkP_0}{\tau_{Hemin}} \exp\left(-\frac{t_3}{\tau_{Hemin}}\right) \quad (8)$$

Where, V denotes the cavity volume of the component under test, and $t_3$ denotes the actual test-waiting time but $t_3$ is no longer than $t_{3max}$ specified in formula (3).

The invention is advantageous by providing a method for quantitative determination of the maximum test-waiting time for fine-leak test during a sealability test process, and a method for determining the criterion for measured leak rate is given by taking the minimum helium gas exchange time constant, i.e., the rigour grade $\tau_{Hemin}$, of an acceptable sealed component as a basic criterion for helium mass spectrometric fine-leak test. The maximum test-waiting time determined quantitatively and the total time for storage and test waiting that is effectively lengthened may be much longer than 1 hour or 0.5 hour as determined qualitatively by the existing related standards in the world. Because the maximum test-waiting time determined quantitatively is used in the sealability test process of a sealed electronic component, a key condition for test-waiting time is obtained for lowering the leak rate of surficially absorbed helium of a component under test, controlling the background of a helium mass spectrometric leak detector, and implementing batch tests. Therefore, the applicable cavity volume range may be expanded, the criterion range may be made stricter, and a method for helium mass spectrometric fine-leak test based on the helium pressurizing method or the helium prefilling method that is more operable may be given with different rigour grades $\tau_{Hemin}$ and reliable storage lives.

DETAILED DESCRIPTION

Figure 1:
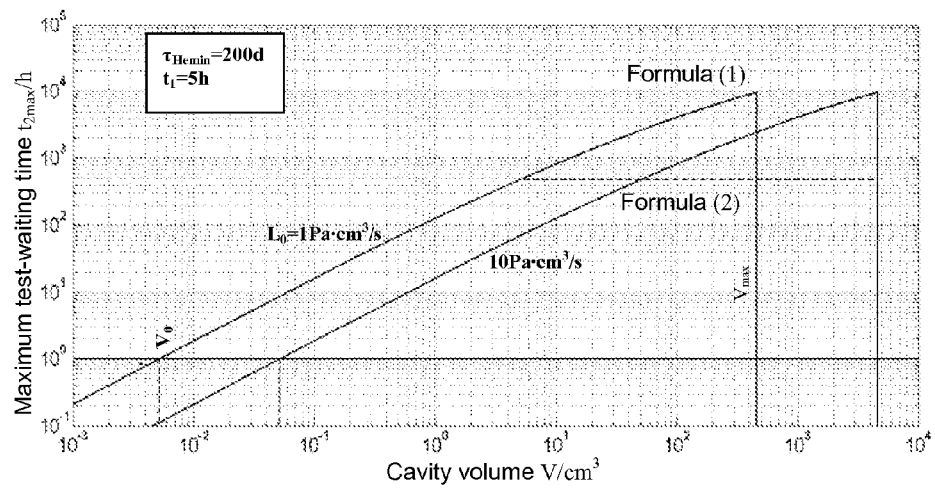
FIG. 1 shows a typical curve of $t_{2max}$ versus V of a helium pressurizing method according to the invention.

The technical solutions of the invention will be further illustrated below by specific embodiments The invention discloses a method of fine-leak test, which may be used for detecting the sealability of a sealed electronic component (referred to as a sealed component herein for short) through a helium mass spectrometric leak detector by way of a helium pressurizing method or helium prefilling method. Further, the invention specifies rigour grades of test and criterions for measured leak rate, and specifies test conditions such as pressure and time of helium pressurizing, a ratio of prefilled helium and the maximum test-waiting time and the test procedure.

A fixed scheme of the method is applicable for the fine-leak test of a sealed component with a cavity volume V of 0.002 cm³~200 cm³, a sealability rigour grade $\tau_{Hemin}$ of 20d, 200d or 2000d and an equivalent standard leak rate L no larger than 1.0 Pa·cm³/s. In a flexible scheme of the method, the cavity volume V and the sealability rigour grade $\tau_{Hemin}$ may be flexibly specified in the respective applicable ranges. The method is especially applicable for the sealability test of a long-life, high-reliability sealed component for space applications, as well as the sealability test of other sealed elements.

The related terms, symbols and definitions used in the invention are described below.

The helium mass spectrometric leak test method is a method for determining the sealability rigour grade of a sealed component by measuring the leak rate of helium gas from inside to the external of the sealed component, which contains the helium gas through helium pressurizing or helium prefilling by a helium mass spectrometric leak detector.

The equivalent standard leak rate L refers to a flow rate of air with a temperature of 25° C.±5° C. and a dew point lower than −25° C. that passes through a leak aperture according to a molecular flow model provided that air is composed of molecules of a single type, where the pressure at an entrance of the leak aperture is 101.3 kPa and the pressure at an exit of the leak aperture is lower than 1 kPa. The equivalent standard leak rate is a virtual equivalent, and also referred to as an air standard leak rate.

The helium standard leak rate $L_{He}$ refers to a flow rate of helium gas with a temperature of 25° C.±5° C. that passes through a leak aperture according to a molecular flow model, where the pressure of the helium gas at an entrance of the leak aperture is standard atmospheric pressure $P_0$, i.e., 101.3 kPa, and the pressure of the helium gas at an exit of the leak aperture is lower than 1 kPa. The standard leak rate of any gas is inversely proportional to the square root of a molecular weight of the gas in grams as follows:

$$L_{He} = \sqrt{\frac{M_A}{M_{He}}} L$$

Where, $M_A$ denotes the mean molecular weight of air in grams, and $M_{He}$ denotes the molecular weight of helium gas in grams.

The fine-leak test refers to sealability test on a sealed component with an equivalent standard leak rate L no larger than 1.0 Pa·cm³/s, i.e., a helium standard leak rate $L_{He}$ no larger than 2.69 Pa·cm³/s.

The gross-leak test refers to sealability test on a sealed component with an equivalent standard leak rate L no less than 1.0 Pa·cm³/s, i.e., a helium standard leak rate $L_{He}$ larger than or equal to 2.69 Pa·cm³/s.

The minimum detectable leak rate $L_0$ of gross-leak test refers to the minimum equivalent standard leak rate that may be detected for a given gross-leak test method.

Helium gas exchange time constant $\tau_{He}$ refers to the time needed when the internal helium gas pressure of a vacuum sealed component in a helium gas environment reaches $(1-1/e)$, i.e., 63.2%, of the environmental helium gas pressure.

$$\tau_{He} = \frac{VP_0}{L_{He}} = \frac{VP_0}{L}\sqrt{\frac{M_{He}}{M_A}}$$

Where, V denotes the cavity volume of the sealed component.

Helium gas exchange time constant $\tau_{He0}$ for gross leak refers to the helium gas exchange time constant corresponding to the minimum detectable leak rate $L_0$ of gross-leak test:

$$\tau_{He0} = \frac{VP_0}{L_0}\sqrt{\frac{M_{He}}{M_A}}$$

A rigour grade $\tau_{Hemin}$ refers to a constant of the allowable minimum helium gas exchange time for an acceptable sealed component under detection.

A criterion $R_{max}$ for measured leak rate may be divided into a criterion $R_{1max}$ for measured leak rate of the helium pressurizing method and a criterion $R_{2max}$ for measured leak rate of the helium prefilling method, values of which are the acceptable maximum values of the helium measured leak rates $R_1$ and $R_2$ of a sealed component that are detected under the specified condition and correspond to a basic criterion (i.e., the rigour grade $\tau_{Hemin}$) in the case of helium mass spectrometric fine-leak test based on the helium pressurizing method and helium mass spectrometric fine-leak test based on the helium prefilling method.

The fixed scheme is such a test scheme that fixed pressure for helium pressurizing, fixed time for helium pressurizing, the fixed maximum test-waiting time and a fixed criterion $R_{1max}$ for measured leak rate are specified for the helium pressurizing method in the case of each specified rigour grade and each specified cavity volume segment, or such a test scheme that a fixed ratio of prefilled helium, the fixed maximum test-waiting time and a fixed criterion $R_{2max}$ for measured leak rate are specified for the helium prefilling method in the case of each specified rigour grade and each specified cavity volume segment. The fixed scheme is convenient and easy to operate but is accompanied with a certain test deviation.

The flexible scheme is such a test scheme that pressure for helium pressurizing, time for helium pressurizing, test-waiting time and a criterion for measured leak rate are flexibly specified for the helium pressurizing method in the case of a rigour grade fixedly or flexibly specified in the condition of a given cavity volume, or such a test scheme that a ratio of prefilled helium, test-waiting time and a criterion for measured leak rate are flexibly specified for the helium prefilling method in the case of a rigour grade fixedly or flexibly specified in the condition of a given cavity volume. The flexible scheme can be used for more accurate test, but involves flexible and specific design and calculation of the test condition and the criterion for measured leak rate.

A helium mass spectrometric leak test method includes Step S1 of helium pressurizing (or helium prefilling upon sealing), Step S2 of storing, Step S3 of removing absorbed helium, and Step S4 of detecting and judging. The needed test instruments and tool sets mainly include: a helium pressurizing tank, a helium prefilling device, a detecting chamber, a standard leak aperture, a helium mass spectrometric leak detector, etc.

The helium pressurizing tank should meet the following requirements of:
  a sustainable internal pressure with an absolute pressure of the pressure for helium pressuring and a sustainable external pressure with an absolute pressure of the standard atmospheric pressure; and
  a pressure drop in 40 hours less than 10% of the initial pressure inside the tank which is the highest pressure of helium pressuring.

The helium prefilling device, including a helium prefilling device of a sealing device, should meet the following requirements that:
  the pressure of prefilled gas is 1.05~1.10 standard atmospheric pressure $P_0$;
  the ratio k of prefilled helium, which is a ratio of the partial pressure of helium gas in a prefilled gas mixture of nitrogen and helium to the standard atmospheric pressure $P_0$ is not deviated by more than ±10%; and
  the component is sealed in the prefilled gas.

The detecting chamber should meet the following requirements that:
  its effective capacity meeting the leak test requirements shall be as small as possible;
  the chamber can be vacuumed to below 5 Pa after being closed; and
  the chamber should be provided with a standard leak aperture interface.

The standard leak aperture should meet the following requirements that:
  the measurable leak rate range that can be calibrated and covered by the nominal value of the leak rate should meet the leak test requirements; and
  the standard leak aperture should be used in the calibration or verification validity period.

The helium mass spectrometric leak detector should meet the corresponding standards and the requirements of the present test method. For qualitative fine-leak test, the stable background value of the helium mass spectrometric leak test system connected to the detecting chamber during a load-free test should be no larger than ⅓ of the criterion for measured leak rate.

During the working process, the following safety regulations shall be followed:
  the gas cylinders of the nitrogen gas and the helium gas should conform to the safety laws and standards;
  the helium pressurizing tank and the connection pipes must pass through a strength test in a condiction of 1.5 times of the pressure of pressurized helium;
  the pressure applied should not be higher than the sustainable pressure of a component under test; and
  the pressurizing and discharging rate of the helium pressurizing tank is controlled, so that both the pressurizing time and the discharging time for reaching a test pressure should be no less than 20 s.

During helium mass spectrometric fine-leak test, the helium mass spectrometric leak test system should meet the following requirements:
  a) a normal maintenance procedure should be carried out on the leak test system according to a maintenance regime, and a periodic calibration should be carried out on the standard leak aperture according to specifications;

b) the leak test system is started and working parameters of the leak detector are adjusted, so that the leak detector is warmed and works for a period of time (for example, for 10~30 load-free tests), and a specified verification method (for example, by 5~10 continuous load-free tests) is employed to verify that the leak test system is in a stable working state. In the stable working state, the stable background value of the leak detector during the load-free test should be no larger than ⅕ of the criterion for measured leak rate;

c) the output indication of the leak test system shall not be adjusted to zero during the initial load-free test with respect to the maximum or large background value, especially the background value larger than or close to the criterion for measured leak rate; otherwise, the output indication of the leak test system with respect to some components with leak under test will be zero, and even a false test may be caused;

d) after a component with a measured leak rate that is large or exceeds the criterion is detected, the leak test system shall be verified whether it is in a stable working state by employing a specified verification method (for example, one or several load-free tests), and then other component is then detected; and e) the vacuumed detecting chamber is filled with gas, preferably with a clean nitrogen gas, so as to alleviate the contamination of the helium gas in the leak test system.

The component under test should meet the following requirements:

a) the welding material structure and the surface conditions of the welding seam, the glass and the ceramic of the component under test should be controlled, and fingerprints, welding flux and organic materials on the surface thereof should be reduced or eliminated, to avoid excessive helium gas absorbed on the surface during helium prefilling, helium pressurizing and storing;

b) measures shall be taken to ensure that no unstable leak aperture or sub-cavity outside a sealing nugget ring exists on the component under test;

c) the nitrogen gas or the mixed nitrogen and helium gas filled when the component under test is sealed should be dry and clean;

d) unless as specified by the storage method below, the component under test should be preserved in a dry and clean air environment with a normal helium gas content, without being contaminated, to prevent a leak aperture from being blocked and alleviate the contamination of the helium mass spectrometric leak test system; and e) any component under test, on which a gross leak test based on a fluorocarbon-bubble method has been carried out, should be subjected to vacuum baking for 72 hours at a temperature of 125° C. and an air pressure no higher than 10 Pa, before a helium pressurizing fine-leak test is carried out on the component again.

5. A process for determining the criterion for measured leak rate and the maximum test-waiting time for a helium mass spectrometric leak test method will be illustrated below by taking the fixed scheme of the helium pressurizing method as an example.

Before testing, the criterion $R_{1max}$ for measured leak rate and the maximum test-waiting time $t_{2max}$ of the fixed scheme of the helium pressurizing method are first determined.

Rigour grades $\tau_{Hemin}$, applicable cavity volume segments, and helium pressurizing conditions and criterions $R_{1max}$ for measured leak rate with regard to the fine-leak test of a sealed component according to the invention are shown in Table 1. In which, the criterion $R_{1max}$ is calculated based on the minimum capacity V in each cavity volume segment according to formula (5).

TABLE 1 relations of the rigour grade, the cavity volume, the helium pressurizing condition and the criterion $R_{1max}$ for measured leak rate of a fixed scheme of the helium pressurizing method of the invention

| Cavity volume V Segment (cm³) | Helium pressurizing condition $P_E t_1$ ($P_0$h) | Rigour grade $\tau_{Hemin}$ | | |
|---|---|---|---|---|
| | | 20 d | 200 d | 2 000 d |
| | | $R_{1max}$ (Pa·cm³/s) | | |
| 0.002~<0.006 | 20 | 5.0E−6 | 5.0E−8 | = |
| | 40 | 1.0E−5 | 1.0E−7 | = |
| | 80 | 2.0E−5 | 2.0E−7 | = |
| | 160 | 4.0E−5 | 4.0E−7 | = |
| | 800 | — | / | 2.0E−8 |
| 0.006~<0.02 | 20 | 1.5E−5 | 1.5E−7 | = |
| | 40 | 3.0E−5 | 3.0E−7 | = |
| | 80 | 6.0E−5 | 6.0E−7 | = |
| | 160 | 1.2E−4 | 1.2E−6 | = |
| | 267 | / | / | 2.0E−8 |
| 0.02~<0.06 | 20 | 5.0E−5 | 5.0E−7 | = |
| | 40 | 1.0E−4 | 1.0E−6 | = |
| | 80 | 2.0E−4 | 2.0E−6 | 2.0E−8 |
| | 160 | 4.0E−4 | 4.0E−6 | 4.0E−8 |
| | 400 | / | / | 1.0E−7 |
| 0.06~<0.2 | 20 | 1.5E−4 | 1.5E−6 | = |
| | 40 | 3.0E−4 | 3.0E−6 | 3.0E−8 |
| | 80 | 6.0E−4 | 6.0E−6 | 6.0E−8 |
| | 160 | 1.2E−3 | 1.2E−5 | 1.2E−7 |
| 0.2~<0.6 | 20 | 5.0E−4 | 5.0E−6 | 5.0E−8 |
| | 40 | 1.0E−3 | 1.0E−5 | 1.0E−7 |
| | 80 | 2.0E−3 | 2.0E−5 | 2.0E−7 |
| 0.6~<2 | 20 | 1.5E−3 | 1.5E−5 | 1.5E−7 |
| | 40 | 3.0E−3 | 3.0E−5 | 3.0E−7 |
| | 80 | 6.0E−3 | 6.0E−5 | 6.0E−7 |
| 2~<6 | 10 | 2.5E−3 | 2.5E−5 | 2.5E−7 |
| | 20 | 5.0E−3 | 5.0E−5 | 5.0E−7 |
| | 40 | 1.0E−2 | 1.0E−4 | 1.0E−6 |
| | 80 | 2.0E−2 | 2.0E−4 | 2.0E−6 |
| 6~<20 | 10 | 7.5E−3 | 7.5E−5 | 7.5E−7 |
| | 20 | 1.5E−2 | 1.5E−4 | 1.5E−6 |
| | 40 | 3.0E−2 | 3.0E−4 | 3.0E−6 |
| | 80 | 6.0E−2 | 6.0E−4 | 6.0E−6 |
| 20~<60 | 10 | 2.5E−2 | 2.5E−4 | 2.5E−6 |
| | 20 | 5.0E−2 | 5.0E−4 | 5.0E−6 |
| | 40 | 1.0E−1 | 1.0E−3 | 1.0E−5 |
| 60~200 | 10 | ☐ | 7.5E−4 | 7.5E−6 |
| | 20 | ☐ | 1.5E−3 | 1.5E−5 |
| | 40 | ☐ | 3.0E−3 | 3.0E−5 |

As shown in Table 1, the sealed component should be able to sustain the pressure of pressurizing helium $P_E$, which shall not be larger than $8P_0$ and generally no less than $2P_0$. However, in the case of a cavity volume $V \geq 1$ cm³, $P_E$ may be no less than $P_0$ for a sealed component with a thin cover. The deviations of $P_E$ and helium pressurizing time $t_1$ in Table 1 and the deviation of helium pressurizing time $t_1$ in Table 2 should not exceed ±5%.

For the fixed scheme of the helium pressurizing method according to the invention, the maximum test-waiting time $t_{2max}$ when $L_0$ is equal to 1.0 Pa·cm³/s is shown in table 2.

TABLE 2 the maximum test-waiting time $t_{2max}$ in the case of $L_0$ of 1.0 Pa·cm³/s in the fixed scheme of the helium pressurizing method of the invention

| Cavity volume V Segment (cm³) | Helium pressurizing time $t_1$ (h) | Rigour grade $\tau_{Hemin}$ | | |
|---|---|---|---|---|
| | | 20 d | 200 d $t_{2max}$ (h) | 2 000 d |
| 0.002~<0.006 | 5 | 0.306 | 0.402 | = |
| | 10 | 0.291 | 0.387 | = |
| | 20 | 0.278 | 0.373 | = |
| | 40 | 0.263 | 0.359 | = |
| | 160 | — | / | 0.426 |
| 0.006~<0.02 | 5 | 0.848 | 1.14 | = |
| | 10 | 0.805 | 1.09 | = |
| | 20 | 0.762 | 1.05 | = |
| | 40 | 0.720 | 1.01 | = |
| | 53.4 | / | / | 1.28 |
| 0.02~<0.06 | 5 | 2.58 | 3.54 | = |
| | 10 | 2.43 | 3.39 | = |
| | 20 | 2.29 | 3.25 | 4.21 |
| | 40 | 2.15 | 3.10 | 4.50 |
| | 80 | / | / | 3.92 |
| 0.06~<0.2 | 5 | 7.04 | 9.92 | = |
| | 10 | 6.61 | 9.49 | 12.4 |
| | 20 | 6.18 | 9.06 | 11.9 |
| | 40 | 5.76 | 8.62 | 11.5 |
| 0.2~<0.6 | 5 | 20.8 | 30.4 | 40.0 |
| | 10 | 19.6 | 29.1 | 38.7 |
| | 20 | 18.1 | 27.7 | 37.3 |
| | 40 | 16.8 | 26.2 | 35.9 |
| 0.6~<2 | 5 | 48.0 | 81.1 | 110 |
| | 10 | 48.0 | 79.1 | 108 |
| | 20 | 47.7 | 75.9 | 105 |
| | 40 | 43.7 | 72.0 | 101 |
| 2~<6 | 2.5 | 48.0 | 227 | 323 |
| | 5 | 48.0 | 226 | 322 |
| | 10 | 48.0 | 224 | 319 |
| | 20 | 48.0 | 219 | 315 |
| | 40 | 48.0 | 217 | 307 |
| 6~<20 | 2.5 | 48.0 | 480 | 833 |
| | 5 | 48.0 | 480 | 832 |
| | 10 | 48.0 | 480 | 830 |
| | 20 | 48.0 | 480 | 825 |
| | 40 | 48.0 | 480 | 817 |
| 20~<60 | 2.5 | 48.0 | 480 | 2283 |
| | 5 | 48.0 | 480 | 2282 |
| | 10 | 48.0 | 480 | 2280 |
| | 20 | 48.0 | 480 | 2275 |
| 60~200 | 2.5 | □ | 480 | 4800 |
| | 5 | □ | 480 | 4800 |
| | 10 | □ | 480 | 4800 |
| | 20 | □ | 480 | 4800 |

In Tables 1 and 2, a symbol "-" represents a limitation by $t_1 \leq \frac{1}{2}\tau_{Hemin}$; a symbol "/" represents inapplicability; a symbol "=" represents a limitation by the detectable measured leak rate; and a symbol "□" represents a limitation by the maximum cavity volume $V_{max}$ applicable to $\tau_{Hemin}$.

The maximum test-waiting time is determined as follows.

For a sealed component with a fixed cavity volume that is subjected to predefined pressure of pressurizing helium for predefined time of pressurizing helium (or with a predefined ratio of prefilled helium), the test-waiting time in which the measured leak rate $R_1$ (or $R_2$) of the helium pressurizing method (or the helium prefilling method) in the conditions of $L=L_0$ and $\tau_{He}=\tau_{He0}$ is attenuated to the criterion $R_{1max}$ (or $R_{2max}$) for measured leak rate in the condition of $\tau_{He}=\tau_{Hemin}$ for the sealed component is regarded as the maximum test-waiting time from the ending of helium pressurizing (or helium prefilling) to the fine-leak test. This is regarded as the correct principle for determining the maximum test-waiting time.

The method for calculating the maximum test-waiting time in the fixed scheme of the helium pressurizing method is as follows.

According to the above principle for determining the maximum test-waiting time, formula (1) may be used for quantitatively calculating the maximum test-waiting time $t_{2max}$ of the helium pressurizing method.

For the fixed scheme, $t_{2max}$ shall conform to formula (2) in order to limit the determination deviation of $\tau_{Hemin}$.

Figure 2:
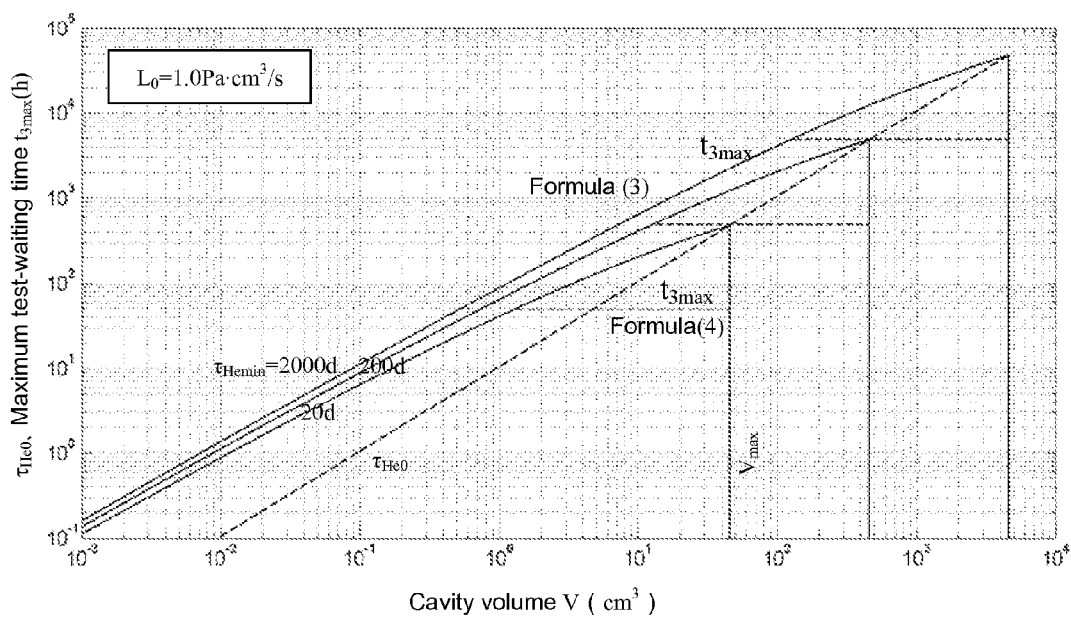
FIG. 2 shows typical curves of $t_{3max}$ versus V and $\tau_{He0}$ versus V of a helium prefilling method according to the invention.
Figure 3:
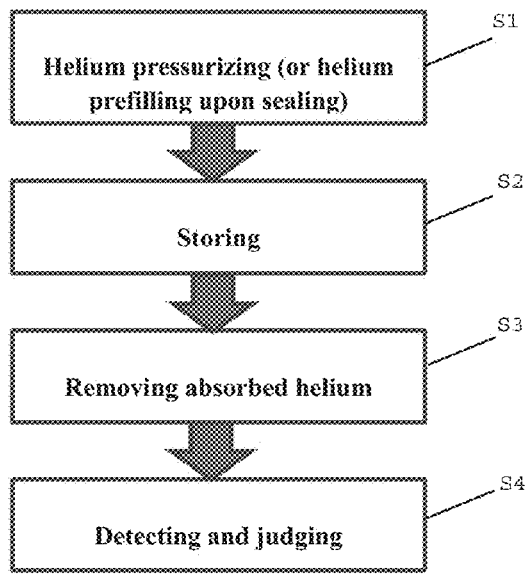
FIG. 3 shows a method, according to embodiments of the disclosure.
Figure 4:
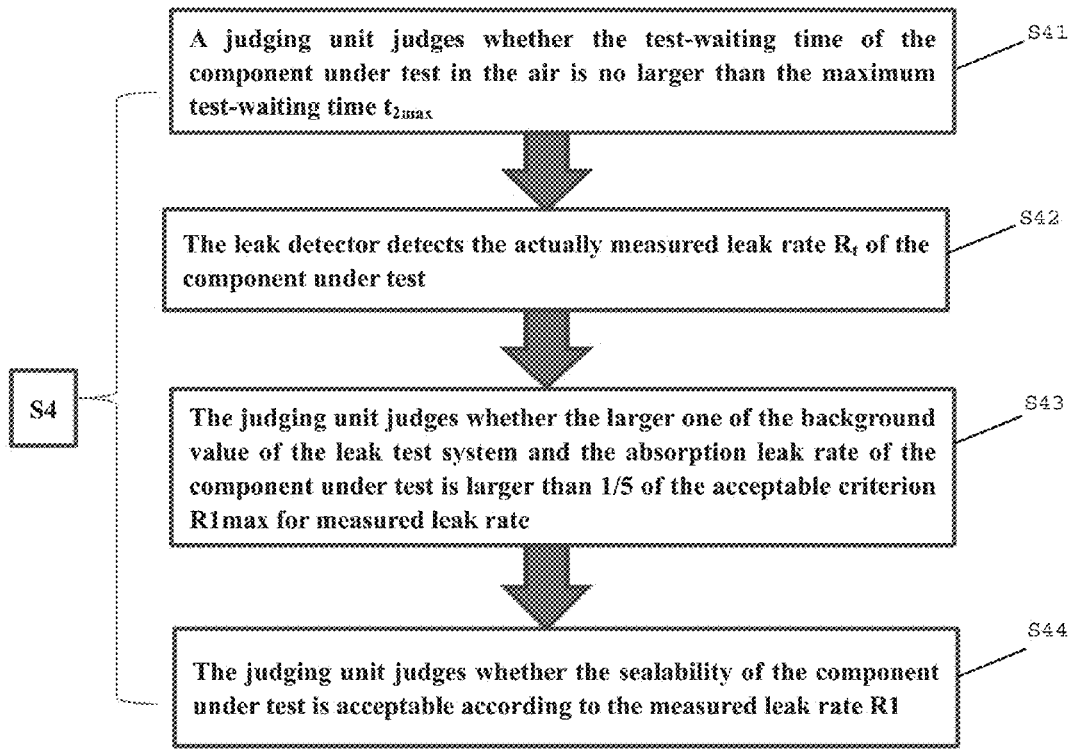
FIG. 4 shows the method of step S4, according to embodiments of the disclosure.
Figure 5:
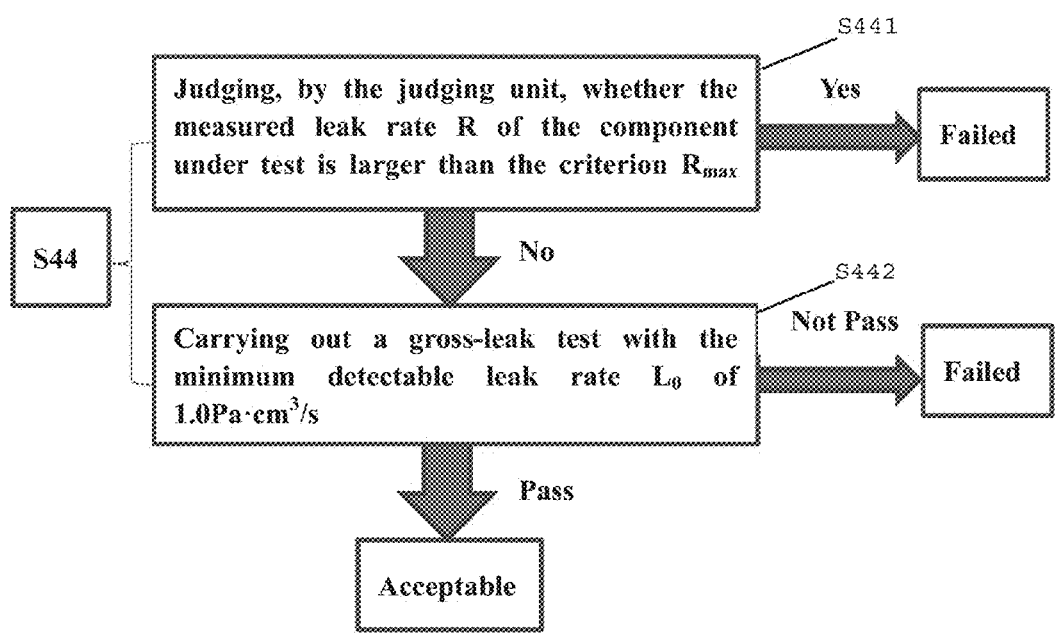
FIG. 5 shows the method of step S44, according to embodiments of the disclosure.

The formula of $\tau_{He0}$ is substituted into formula (1), and a typical curve of $t_{2max}$ versus V in the helium pressurizing method is obtained according to formula (1) and (2), as shown in FIG. 1. The typical curve of $t_{2max}$ versus V of the helium pressurizing method is shown in FIG. 1, and typical curves of $t_{3max}$ versus V and $\tau_{He0}$ versus V of the helium prefilling method are shown in FIG. 2. In FIGS. 1 and 2, because of $L \leq L_0$, the maximum cavity volume applicable for $\tau_{Hemin}$ is:

$$V_{max} = \frac{L_0 \tau_{Hemin}}{P_0} \sqrt{\frac{M_A}{M_{He}}} \quad (9)$$

In FIG. 1, the triangle zone on the lower left of a point $V_0$ is an avoidable leak test blind zone when the maximum test-waiting time is shorter than 1 hour as specified qualitatively if the method for quantitative determination of the maximum test-waiting time and formula (1) are employed; the triangular or trapezoidal zone on the upper right of the point $V_0$ is a great test-waiting time resource zone released after formula (1) or (2) is employed, and the maximum test-waiting time is not fixed at 1 hour, but may be several hours, tens of hours, or even hundreds of hours or thousands of hours. FIG. 1 also shows the significant influence of the minimum detectable leak rate $L_0$ of gross-leak test on $t_{2max}$ and $V_{max}$.

The test procedure in the fixed scheme of helium mass spectrometric fine-leak test based on the helium-pressurizing method is as follows.

At Step S1, a component under test is put into a helium pressurizing tank, and the helium pressurizing tank is vacuumed to below 100 Pa; then, helium gas is filled into the helium pressurizing tank within 20 s according to the pressure of pressurizing helium $P_E$ and time $t_1$ selected from Table 1, and the pressure of pressurizing helium $P_E$ is maintained in time $t_1$.

At Step S2, a part of the components under test that are not selected for test, of which the total storage and test-waiting time needs to be extended, are preserved in a helium pressurizing tank or a storage tank with a total pressure of $(1+10\%) P_0$ and a partial pressure of helium gas of $(1+10\%) P_E t_1/\tau_{Hemin}$ for storage time no more than the rigour grade $\tau_{Hemin}$. The test-waiting time is counted starting from the ending of the storage, and for a component under test by the helium pressurizing method based on the storage method, the maximum test-waiting time $t_{2max}$ takes the value of $t_{3max}$ in formula (3).

At Step S3, the surficially absorbed helium of the component under test is removed after the above storage or helium pressurizing during subsequent storage, and the removal may be accelerated by a shower of dry air, nitrogen gas or carbon dioxide, or by heated baking or heated vacuum baking; moreover, the removal may be more effective by improving the baking temperature than extending the baking time.

Additionally, no direct or potential damage should be made on the component under test during the removing process; and the time used for the removing process should guarantee that the test of the component is completed within time $t_{2max}$, and generally no longer than (½) $t_{2max}$. Verification shall be made to confirm that the additional leak rate caused by the surficially absorbed helium of the component under test after the above removal, i.e., the absorption leak rate, should be no larger than ⅕ of the criterion for measured leak rate. Such verification may be carried out with 3 comparison samples with the same shape and appearance, which have been verified to be sealed components without any leak; or, components under test in the same batch with controlled quality may be employed, and 3 samples with a low tested leak rate are taken from the first 10 detected samples, with the actual measured leak rates of the 3 samples being regarded as close to zero, and then the absorption leak rate may be obtained by subtracting the stable background value of the leak detector from the tested leak rate.

At step S4, the leak detector detects the actually measured leak rate $R_t$ of the component under test, gives the measured leak rate $R_1$ of the component, and determines whether the sealability of the component is acceptable. Specifically, Step S4 includes the following Steps S41-S44.

At Step S41, a judging unit judges whether the test-waiting time of the component under test in the air is no larger than the maximum test-waiting time $t_{2max}$, and if so, Step S42 is performed.

At Step S42, the leak detector detects the actually measured leak rate $R_t$ of the component under test, and the judging unit judges whether the time taken by the leak detector to detect the component under test reaches the preset time $t_0$, or whether the actually measured leak rate $R_t$ as detected is less than or equal to a criterion $R_{1max}$ for measured leak rate, and then the actually measured leak rate $R_t$ is read from the leak detector either the time taken by the leak detector to detect the component under test reaches the preset time $t_0$ or the actually measured leak rate $R_t$ as detected is less than or equal to a criterion $R_{1max}$ for measured leak rate.

The preset time $t_0$ is determined in such a manner that: the time in which the leak test system ensures that the background value is no larger than ⅕ of the criterion for measured leak rate, which is determined by a load-free test on the detecting chamber, is taken as the preset time $t_0$, i.e. the time when the detector reads the actually measured leak rate $R_t$ of the component under test. The preset time $t_0$ may be variously specified depending on different leak detectors and detecting chambers. For the purpose of judgment merely, the value of the actually measured leak rate $R_t$ may be read and determine that the measured leak rate $R_1$ of fine-leak test is equal to or less than $R_{1max}$ so long as the actually measured leak rate $R_t$ displayed is no larger than the criterion $R_{1max}$ for measured leak rate, and then the fine-leak test of the component under test is completed.

At Step S43, the judging unit judges whether the larger one of the background value of the leak test system and the absorption leak rate of the component under test is larger than ⅕ of the acceptable criterion $R_{1max}$ for measured leak rate; if not, the measured leak rate $R_t$ in Step S42 is regarded as the measured leak rate $R_1$ of the component under test; and if the absorption leak rate is larger than ⅕ of $R_{1max}$, the actually measured leak rate $R_t$ subtracted by the absorption leak rate is regarded as the measured leak rate $R_1$ of the component under test.

At Step S44, the judging unit judges whether the sealability of the component under test is acceptable according to the measured leak rate $R_1$ in Step S43.

When the measured leak rate $R_1$ of the component under test is larger than $R_{1max}$ determined in Table 1, the sealability of the component under test is judged as failed; and when the measured leak rate $R_1$ of the component under test is equal to or less than $R_{1max}$, a gross-leak test with the minimum detectable leak rate $L_0$ of 1.0 Pa·cm³/s should be carried out. If the component does not pass the gross-leak test, the sealability of the component is judged as failed; and if the component passes the gross-leak test, the sealability of the component is judged as acceptable.

The measuring process of the flexible scheme of the helium pressurizing method is substantially the same as the measuring process of the fixed scheme of the helium pressurizing method, except for the following.

In Step S1, a component under test is put into a helium pressurizing tank vacuumed to below 100 Pa; then, helium gas is filled into the helium pressurizing tank within 20 seconds according to the pressure of pressurizing helium $P_E$ and the time $t_1$ selected when determining the criterion $R_{1max}$ for measured leak rate in the flexible scheme of the helium pressurizing method, and the pressure of pressurizing helium $P_E$ remains unchanged for time $t_1$.

The determining process of the criterion $R_{1max}$ for measured leak rate in the flexible scheme of the helium pressurizing method is as follows.

In the flexible scheme of the helium pressurizing method, in conditions of an equivalent standard leak rate $L \le L_0 = 1.0$ Pa·cm³/s and a detectable criterion for measured leak rate $\ge 1.0 \times 10^{-7}$ Pa·cm³/s (which may be larger than or equal to $2 \times 10^{-8}$ Pa·cm³/s in the case of a cavity volume $V \le 0.2$ cm³) for the sealed component, suitable $P_E$ and $t_1$ are selected for the cavity volume V of the sealed component and the specified $\tau_{Hemin}$, and the criterion $R_{1max}$ for measured leak rate of the sealed component is calculated according to formula (6) based on the actual test-waiting time $t_2$ which should be no larger than $t_{2max}$ specified in formula (1).

In Step S41, the actual test-waiting time of the component under test in the air is regarded as the test-waiting time $t_2$, and $t_2$ should not exceed the maximum test-waiting time $t_{2max}$ specified in formula (1).

In Step S44, the specific judging process includes that: when the measured leak rate $R_1$ of the component under test is larger than $R_{1max}$ determined according to formula (6), the sealability of the component is judged as failed; when the measured leak rate $R_1$ of the component is equal to or less than $R_{1max}$, a gross-leak test with the minimum detectable leak rate $L_0$ of 1.0 Pa·cm³/s is carried out; if the component does not pass the gross-leak test, the sealability of the component is judged as failed; and if the component passes the gross-leak test, the sealability of the component is judged as acceptable.

The helium prefilling method may include a fixed scheme and a flexible scheme, the measuring process of the helium prefilling method is substantially the same as that of the helium pressurizing method, except for the following differences in the process for determining the criterion for measured leak rate and the maximum test-waiting time.

The calculating of the criterion $R_{2max}$ for measured leak rate in the fixed scheme of the helium prefilling method is as follows. In the fixed scheme of the helium prefilling method, each rigour grade $\tau_{Hemin}$ and the applicable cavity volume are segmented, and the ratio of prefilled helium and the criterion $R_{2max}$ for measured leak rate in the fine-leak test of a sealed component are shown in Table 3, in which $R_{2max}$ is calculated according to formula (7) based on the minimum capacity V in the cavity volume segment.

TABLE 3 relations of the rigour grade, the cavity volume, the ratio of prefilled helium and the criterion $R_{2max}$ for measured leak rate of a fixed scheme of the helium mass spectrometric fine-leak testbased on a helium-prefilling method of the invention;

| Cavity volume | Ratio of prefilled | Rigour grade $\tau_{Hemin}$ | | |
|---|---|---|---|---|
| V Segment (cm³) | helium k | 20 d | 200 d | 2000 d |
| | | $R_{2max}$ (Pa · cm³/s) | | |
| 0.002~<0.006 | 0.1 | 1.2E-5 | 1.2E-6 | 1.2E-7 |
| | 0.5 | 6.0E-5 | 6.0E-6 | 6.0E-7 |
| 0.006~<0.02 | 0.1 | 3.6E-5 | 3.6E-6 | 3.6E-7 |
| | 0.5 | 1.8E-4 | 1.8E-5 | 1.8E-6 |
| 0.02~<0.06 | 0.1 | 1.2E-4 | 1.2E-5 | 1.2E-6 |
| | 0.5 | 6.0E-4 | 6.0E-5 | 6.0E-6 |
| 0.06~<0.2 | 0.1 | 3.6E-4 | 3.6E-5 | 3.6E-6 |
| | 0.5 | 1.8E-3 | 1.8E-4 | 1.8E-5 |
| 0.2~<0.6 | 0.1 | 1.2E-3 | 1.2E-4 | 1.2E-5 |
| | 0.5 | 6.0E-3 | 6.0E-4 | 6.0E-5 |
| 0.6~<2 | 0.1 | 3.6E-3 | 3.6E-4 | 3.6E-5 |
| | 0.5 | 1.8E-2 | 1.8E-3 | 1.8E-4 |
| 2~<6 | 0.1 | 1.2E-2 | 1.2E-3 | 1.2E-4 |
| | 0.5 | 6.0E-2 | 6.0E-3 | 6.0E-4 |
| 6~<20 | 0.1 | 3.6E-2 | 3.6E-3 | 3.6E-4 |
| | 0.5 | 1.8E-1 | 1.8E-2 | 1.8E-3 |
| 20~<60 | 0.1 | 1.2E-1 | 1.2E-2 | 1.2E-3 |
| | 0.5 | 6.0E-1 | 6.0E-2 | 6.0E-3 |
| 60~200 | 0.1 | □ | 3.6E-2 | 3.6E-3 |
| | 0.5 | □ | 1.8E-1 | 1.8E-2 |

For the fixed scheme of the helium prefilling method, when $L_0$ is equal to 1.0 Pa·cm³/s, the maximum test-waiting time $t_{3max}$ is shown in Table 4.

TABLE 4 the maximum test-waiting time $t_{3max}$ in the case of $L_0$ of 1.0 Pa · cm³/s in the fixed scheme of the helium prefilling method of the invention

| Cavity volume | Rigour grade $\tau_{Hemin}$ | | |
|---|---|---|---|
| V Segment (cm³) | 20 d | 200 d | 2 000 d |
| | $t_{3max}$ (h) | | |
| 0.002~<0.006 | 0.210 | 0.258 | 0.306 |
| 0.006~<0.02 | 0.561 | 0.706 | 0.850 |
| 0.02~<0.06 | 1.62 | 2.10 | 2.58 |
| 0.06~<0.2 | 4.17 | 5.61 | 7.06 |
| 0.2~<0.6 | 11.4 | 16.2 | 21.0 |
| 0.6~<2 | 27.6 | 41.7 | 56.1 |
| 2~<6 | 48.0 | 114 | 162 |
| 6~<20 | 48.0 | 276 | 417 |
| 20~<60 | 48.0 | 480 | 1142 |
| 60~200 | □ | 480 | 2758 |

In Tables 3 and 4, "□" represents a limitation by the maximum cavity volume $V_{max}$ applicable to $\tau_{Hemin}$.

The calculating of the criterion $R_{2max}$ for measured leak rate in the flexible scheme of the helium prefilling method is as follows. In conditions of an equivalent standard leak rate $L \leq L_0 = 1.0$ Pa·cm³/s and the detectable criterion for measured leak rate $\geq 1.0 \times 10^{-7}$ Pa·cm³/s, the value of k is selected from a range of 0.05~1 with respect to the cavity volume V of the sealed component and the specified $\tau_{Hemin}$, and the criterion $R_{2max}$ for measured leak rate of the sealed component is calculated as per formula (8) based on the actual test-waiting time $t_3$ which is no larger than $t_{3max}$ specified in formula (3).

According to the principle of correctly determining the maximum test-waiting time, formula (3) is used for quantitatively calculating the maximum test-waiting time $t_{3max}$ in the helium prefilling method.

For the fixed scheme, in order to control the deviation in determining $\tau_{Hemin}$, $t_{3max}$ should follow formula (4).

Formula of $\tau_{He0}$ is substituted into formula (3), and typical curves of $t_{3max}$ versus V and $\tau_{He0}$ versus V for the helium prefilling method are obtained according to formula (3)-(4) and the formula of $\tau_{He0}$, as shown in FIG. 2, which not only shows a relation between $t_{3max}$ and V, but also a relation between $\tau_{He0}$ and V, as well as the influence of $\tau_{Hemin}$ on $t_{3max}$.

The fine-leak test based on the helium prefilling method differs from the fine-leak test based on the helium pressurizing method as follows.

Before Step S1, the step of filling a gas into the component under test includes: filing a gas mixture of a pressure of $(1.05$~$1.10)P_0$ into the sealed component under test according to a determined ratio of prefilled helium k. Where, k denotes a ratio of the partial pressure of helium gas in the prefilled gas mixture of nitrogen and helium to $P_0$.

If the storage method of Step S2 is employed, the component continues to be stored in a helium prefilling device or a storage tank with an atmosphere the same as the prefilled gas mixture, for storage time not exceeding the rigour grade $\tau_{Hemin}$. The test-waiting time is counted starting from the ending of the storage.

In Step S3, the removal of the surficially absorbed helium in the helium prefilling method may be conducted in the same manner as in the fixed scheme of the helium pressurizing method, except that $t_{3max}$ instead of $t_{2max}$ is used.

In Step S41, in the case of the fixed scheme of the helium prefilling method, the maximum test-waiting time $t_{3max}$ determined in Table 4 instead of the maximum test-waiting time $t_{2max}$ is used; and in the case of the flexible scheme of the helium prefilling method, the actual test-waiting time $t_3$ is used, but the value of $t_3$ should be no larger than the maximum test-waiting time $t_{3max}$ specified in formula (3).

In Steps S42 and S43, $R_{2max}$ instead of $R_{1max}$ is used, and $R_2$ instead of $R_1$ is used.

In Step S44, in the case of the fixed scheme of the helium prefilling method, when the measured leak rate $R_2$ of the component under test is larger than the criterion $R_{2max}$ for measured leak rate that is determined in Table 2 (or according to formula (8) in the case of the flexible scheme of the helium prefilling method), the sealability of the component is judged as failed. When the measured leak rate $R_2$ of the component under test is equal to or less than $R_{2max}$, a gross-leak test with the minimum detectable leak rate $P_0$ of 1.0 Pa·cm³/s is carried out. If the component does not pass the gross-leak test, the sealability of the component is judged as failed; and if the component passes the gross-leak test, the sealability of the component is judged as acceptable.

With the method for helium mass spectrometric fine-leak test of the invention, the maximum test-waiting time can be quantitatively determined, thus the total time for storage and test waiting may be effectively lengthened. The rigour grade $\tau_{Hemin}$ is used for determining the criterion for measured leak rate, so that the enterprise standard, the industry standard, the national standard, the national military standard and the IEEE standard for helium mass spectrometric fine-leak test based on the helium-pressurizing method and the helium-prefilling method may be improved, thereby the maximum test-waiting time and the related test conditions for lowering the surface absorption leak rate of the component under test and controlling the leak detector background value may be more operable. Therefore, the sealability rigour grade and the criterion for measured leak rate can be stricter, the rigour grade can be hierarchized, the reliable storage life of a sealed component can be improved, to meet requirements of different equipments, including equipments requiring high reliability and a long storage life as well as space navigation equipments.

The methods of the invention have been described above in conjunction with the specific embodiments. Such description is only used for explaining the methods of the invention, rather than being interpreted as limiting the scope of the invention in any way. Moreover, other specific embodiments of the invention may be made by those skilled in the art based on the explanation herein without creative work, and all these embodiments will fall into the scope of the invention.

What is claimed is:

1. A method for detecting sealability of a sealed electronic component, which applies a helium mass spectrometric fine-leak test based on a quantitative determination of a maximum test-waiting time $t_{max}$ to provide a stricter criterion with respect to sealability, for classifying the sealability, and for extending the reliable storage life of the sealed electronic component, comprising the following steps (S1), (S3), and (S4):

(S1) a component under test is put into a helium pressurizing tank, and the helium pressurizing tank is vacuumed to below 100 Pa; then, helium gas is filled into the helium pressurizing tank within 20 s according to the pressure of pressurizing helium $P_E$ and time $t_1$ selected from Table 1, and the pressure of pressurizing helium $P_E$ is maintained in time $t_1$;

(S3) the surficially absorbed helium of the component under test is removed after the above storage or helium pressurizing during subsequent storage; wherein no direct or potential damage should be made on the component under test during the removing process; and the time used for the removing process should guarantee that the test of the component is completed within time $t_{2max}$ and wherein the additional leak rate caused by the surficially absorbed helium of the component under test after the above removal, i.e., the absorption leak rate, should be no larger than 1/5 of the criterion for measured leak rate;

(S4) the leak detector detects the actually measured leak rate $R_t$ of the component under test, gives the measured leak rate $R_1$ of the component, and determines whether the sealability of the component is acceptable, comprising the following steps (S41)-(S44):

(S41), judging, by a judging unit, whether a test-waiting time in which a component under test waits for test in the air is no longer than the maximum test-waiting time $t_{max}$ determined quantitatively, where a flexible scheme helium mass spectrometric fine-leak test based on a helium-pressurizing method is employed and the maximum test-waiting time $t_{max}$ is $t_{2max}$, and when $\tau_{Hemin} > \tau_{He0}$, $t_{2max}$ is obtained by formula (1) in conditions of $L=L_0$ and $\tau_{He}=\tau_{He0}$;

where L denotes an equivalent standard leak rate, $L_0$ denotes a minimum detectable leak rate of gross-leak test, $\tau_{He}$ denotes a helium gas exchange time constant, $\tau_{Hemin}$ denotes the minimum helium as exchange time constant of an acceptable sealed component, $\tau_{He0}$ denotes a helium gas exchange time constant for gross leak, $$\tau_{He0} = \frac{VP_0}{L_0}\sqrt{\frac{M_{He}}{M_A}}$$

where, V denotes the cavity volume of a component under test, $P_0$ denotes standard atmospheric pressure, $M_{He}$ denotes the molecular weight of helium as in grams, and $M_A$ denotes the mean molecular weight of air in grams;

$$t_{2max} = \frac{\tau_{Hemin}\tau_{He0}}{\tau_{Hemin}-\tau_{He0}}\left\{\ln\left(\frac{\tau_{Hemin}}{\tau_{He0}}\right)+\ln\left[\frac{1-\exp\left(-\frac{t_1}{\tau_{He0}}\right)}{1-\exp\left(-\frac{t_1}{\tau_{Hemin}}\right)}\right]\right\} \quad (1)$$

where, $t_1$ denotes a time for applying pressurized helium on the component under test in a helium pressurizing tank;

$t_{2max}$ also should conforms to formula (2):

$$t_{2max} \leq \frac{1}{10}\tau_{Hemin} \quad (2);$$

(S42) the leak detector detects the actually measured leak rate $R_t$ of the component under test, and the judging unit judges whether the time taken by the leak detector to detect the component under test reaches the preset time $t_0$, or whether the actually measured leak rate $R_t$ as detected is less than or equal to a criterion $R_{1max}$ for measured leak rate, and then the actually measured leak rate $R_t$ is red from the leak detector either the time taken by the leak detector to detect the component under test reaches the preset time $t_0$ or the actually measured leak rate $R_t$ as detected is less than or equal to a criterion $R_{1max}$ for measured leak rate;

wherein the preset time $t_0$ is determined in such a manner that: the time in which the leak test system ensures that the background value is no larger than 1/5 of the criterion for measured leak rate, which is determined by a load-free test on the detecting chamber, is taken as the reset time $t_0$, i.e. the time when the detector reads the actually measured leak rate $R_t$ of the component under test;

(S43) the judging unit judges whether the larger one of the background value of the leak test system and the absorption leak rate of the component under test is larger than 1/5 of the acceptable criterion $R_{1max}$ for measured leak rate; if not, the actually measured leak rate $R_t$ in Step S42 is regarded as the measured leak rate $R_1$ of the component under test; and if the absorption leak rate is larger than 1/5 of $R_{1max}$, the actually measured leak rate $R_t$ subtracted by the absorption leak rate is regarded as the measured leak rate $R_1$ of the component under test;

(S44) the judging unit judges whether the sealability of the component under test is acceptable according to the measured leak rate $R_1$ in Step S43, comprising the following steps (S441) and (S442):

(S441) judging, by the judging unit, whether the measured leak rate $R_1$ of the component under test is larger than the criterion $R_{1max}$ for measured leak rate; when the measured leak rate $R_1$ is larger than the criterion $R_{1max}$, the sealability of the component under test is judged as failed; and when the measured leak rate $R_1$ of the component under test is equal to or less than the criterion $R_{1max}$, Step S442 is performed;

(S442) carrying out a gross-leak test with the minimum detectable leak rate $L_0$ of 1.0 Pa·cm³/s; if the component does not pass the gross-leak test, the sealability of the component under test is judged as failed; and if the component passes the gross-leak test, the sealability of the component under test is judged as acceptable;

where, a rigour grade $\tau_{Hemin}$ is taken as a basic criterion for helium mass spectrometric fine-leak test, and the criterion $R_{1max}$ for measured leak rate is calculated from $\tau_{Hemin}$;

$R_{1max}$ is obtained by formula (5) in conditions of $t_1 \leq (1/5)\ \tau_{Hemin}$ in and actual test-waiting time $t_2 \leq t_{2max}$, $$R_{1max} = \frac{VP_E t_1}{\tau_{Hemin}^2} \quad (5)$$

where, V denotes the minimum cavity volume in a cavity volume segment of the fixed scheme.

2. The method of claim 1, where a step of (S2) effectively lengthening the total time for storage and test waiting is employed after the step of (S1) and before the step (S3), comprising:

the component under test is put into a helium pressurizing tank which is then vacuumed, and a pressure $P_E$ of pressurizing helium is applied for time $t_1$, then partial components waiting for test are stored in a helium pressurizing tank or a storage tank with a total pressure of $(1+10\%)P_0$ and a partial pressure of helium gas of $(1+10\%)\ P_E t_1/\tau_{Hemin}$ for storage time not exceeding a rigour grade $\tau_{Hemin}$, and the maximum test-waiting time $t_{2max}$ starts from the ending of the storage and takes a value of $t_{3max}$ calculated according to formula (3):

$$t_{3max} = \frac{\tau_{Hemin}\tau_{He0}}{\tau_{Hemin} - \tau_{He0}} \ln\left(\frac{\tau_{Hemin}}{\tau_{He0}}\right). \quad (3)$$

3. A method for detecting sealability of a sealed electronic component, which applies a helium mass spectrometric fine-leak test based on a quantitative determination of a maximum test-waiting time $t_{max}$ to provide a stricter criterion with respect to sealability, for classifying the sealability, and for extending the reliable storage life of the sealed electronic component, comprising the following steps (S1), (S3), and (S4):

(S1) a component under test is put into a helium pressurizing tank, and the helium pressurizing tank is vacuumed to below 100 Pa; then, helium gas is filled into the helium pressurizing tank within 20 s according to the pressure of pressurizing helium $P_E$ and time $t_1$ selected from Table 1, and the pressure of pressurizing helium $P_E$ is maintained in time $t_1$;

(S3) the surficially absorbed helium of the component under test is removed after the above storage or helium pressurizing during subsequent storage; wherein no direct or potential damage should be made on the component under test during the removing process; and the time used for the removing process should guarantee that the test of the component is completed within time $t_{2max}$ and wherein the additional leak rate caused by the surficially absorbed helium of the component under test after the above removal, i.e., the absorption leak rate, should be no larger than 1/5 of the criterion for measured leak rate; and (S4) detecting and judging: the leak detector detects the actually measured leak rate $R_t$ of the component under test, gives the measured leak rate $R_1$ of the component, and determines whether the sealability of the component is acceptable, comprising the following steps (S41)-(S44):

(S41) judging, by a judging unit, whether a test-waiting time in which a component under test waits for test in the air is no longer than the maximum test-waiting time $t_{max}$ determined quantitatively, where a fixed scheme of helium mass spectrometric fine-leak test based on a helium-pressurizing method is employed, and the maximum test-waiting time $t_{max}$ is $t_{2max}$ and when $\tau_{Hemin} > \tau_{He0}$, $t_{2max}$ is obtained by formula (1) in conditions of $L=L_0$ and $\tau_{He}=\tau_{Hemin}$, where L denotes an equivalent leak rate, $L_0$ denotes a minimum detectable leak rate of gross-leak test, $\tau_{He}$ denotes a helium gas exchange time constant, $\tau_{Hemin}$ denotes the minimum helium gas exchange time constant of an acceptable sealed component, and $\tau_{He0}$ denotes a helium gas exchange time constant for gross leak, $$\tau_{He0} = \frac{VP_0}{L_0}\sqrt{\frac{M_{He}}{M_A}}$$

where, V denotes the cavity volume of a component under test, $P_0$ denotes standard atmospheric pressure, $M_{He}$ denotes the molecular weight of helium gas in grams, and $M_A$ denotes the mean molecular weight of air in grams:

$$t_{2max} = \frac{\tau_{Hemin}\tau_{He0}}{\tau_{Hemin} - \tau_{He0}}\left\{\ln\left(\frac{\tau_{Hemin}}{\tau_{He0}}\right) + \ln\left[\frac{1-\exp\left(-\frac{t_1}{\tau_{He0}}\right)}{1-\exp\left(-\frac{t_1}{\tau_{Hemin}}\right)}\right]\right\} \quad (1)$$

where, $t_1$ denotes a time for applying pressurized helium on the component under test in a helium pressurizing tank;

(S42) the leak detector detects the actually measured leak rate $R_t$ of the component under test, and the judging unit judges whether the time taken by the leak detector to detect the component under test reaches the preset time $t_0$ or whether the actually measured leak rate $R_t$ as detected is less than or equal to a criterion $R_{1max}$ for measured leak rate, and then the actually measured leak rate $R_t$ is red from the leak detector either the time taken by the leak detector to detect the component under test reaches the preset time $t_0$ or the actually measured leak rate $R_t$ as detected is less than or equal to a criterion $R_{1max}$ for measured leak rate;

wherein the preset time $t_0$ is determined in such a manner that: the time in which the leak test system ensures that the background value is no larger than 1/5 of the criterion for measured leak rate, which is determined by a load-free test on the detecting chamber, is taken as the preset time $t_0$, i.e. the time when the detector reads the actually measured leak rate $R_t$ of the component under test;

(S43) the judging unit judges whether the larger one of the background value of the leak test system and the absorption leak rate of the component under test is larger than ⅕ of the acceptable criterion $R_{1max}$ for measured leak rate; if not, the actually measured leak rate $R_t$ in Step S42 is regarded as the measured leak rate $R_1$ of the component under test and if the absorption leak rate is larger than ⅕ of $R_{1max}$, the actually measured leak rate $R_t$ subtracted by the absorption leak rate is regarded as the measured leak rate $R_1$ of the component under test; and (S44) the judging unit judges whether the sealability of the component under test is acceptable according to the measured leak rate $R_1$ in the step of (S43), comprising the following steps (S441) and (S442):

(S441) judging, by the judging unit, whether the measured leak rate $R_1$ of the component under test is larger than the criterion $R_{1max}$ for measured leak rate; when the measured leak rate $R_1$ is larger than the criterion $R_{1max}$, the sealability of the component under test is judged as failed; and when the measured leak rate $R_1$ of the component under test is equal to or less than the criterion $R_{1max}$, Step S442 is performed; and (S442) carrying out a gross-leak test with the minimum detectable leak rate $L_0$ of 1.0 Pa·cm³/s; if the component does not pass the gross-leak test, the sealability of the component under test is judged as failed; and if the component passes the gross-leak test, the sealability of the component under test is judged as acceptable;

where, a rigour grade $\tau_{Hemin}$ is taken as a basic criterion for helium mass spectrometric fine-leak test, and the criterion $R_{1max}$ for measured leak rate is calculated from $T_{Hemin}$;

$R_{1max}$ is obtained via formula (6):

$$R_{1max} = \frac{VP_E}{\tau_{Hemin}}\left[1 - \exp\left(-\frac{t_1}{\tau_{Hemin}}\right)\right]\exp\left(-\frac{t_2}{\tau_{Hemin}}\right) \quad (6)$$

where, V denotes the cavity volume of the component under test, $t_2$ denotes the actual test-waiting time, which should be no longer than $t_{2max}$ specified in formula (1).

4. The method of claim 3, where a step of (S2) effectively lengthening the total time for storage and test waiting is employed after the step of (S1) and before the step of (S3), comprising:

the component under test is put into a helium pressurizing tank which is then vacuumed, and a pressure $P_E$ of pressurizing helium is applied for time $t_1$, then partial components waiting for test are stored in a helium pressurizing tank or a storage tank with a total pressure of $(1+10\%) P_0$ and a partial pressure of helium gas of $(1+10\%) P_E t_1/\tau_{Hemin}$ for storage time not exceeding a rigour grade $\tau_{Hemin}$, and the maximum test-waiting time $t_{2max}$ starts from the ending of the storage and takes a value of $t_{3max}$ calculated according to formula (3):

$$t_{3max} = \frac{\tau_{Hemin}\tau_{He0}}{\tau_{Hemin} - \tau_{He0}}\ln\left(\frac{\tau_{Hemin}}{\tau_{He0}}\right). \quad (3)$$

5. A method for detecting sealability of a sealed electronic component, which applies a helium mass spectrometric fine-leak test based on a quantitative determination of a maximum test-waiting time $t_{max}$ to provide a stricter criterion with respect to sealability, for classifying the sealability, and for extending the reliable storage life of the sealed electronic component, comprising the following steps (S1), (S3), and (S4):

(S1) a component under test is put into a helium pressurizing tank vacuumed to below 100 Pa; then, helium gas is filled into the helium pressurizing tank within 20 seconds with maintaining a pressure of pressurizing helium $P_E$ for time $t_1$;

(S3) the surficially absorbed helium of the component under test is removed after the above storage or helium pressurizing during subsequent storage; wherein no direct or potential damage should be made on the component under test during the removing process; and the time used for the removing process should guarantee that the test of the component is completed within time $t_{2max}$ and wherein the additional leak rate caused by the surficially absorbed helium of the component under test after the above removal, i.e., the absorption leak rate, should be no larger than ⅕ of the criterion for measured leak rate; and (S4) detecting and judging: the leak detector detects the actually measured leak rate $R_t$ of the component under test, gives the measured leak rate $R_2$ of the component, and determines whether the sealability of the component is acceptable, comprising the following steps (S41)-(S44):

(S41) judging, by a judging unit, whether a test-waiting time in which a component under test waits for test in the air is no longer than the maximum test-waiting time $t_{max}$ determined quantitatively, where a flexible scheme of helium mass spectrometric fine-leak test based on the helium-prefilling method is employed, and the maximum test-waiting time $t_{max}$ is $t_{3max}$; if $\tau_{Hemm} > \tau_{He0}$, $t_{3max}$ is obtained by formula (3) in conditions of $L=L_0$ and $\tau_{He}=\tau_{He0}$, where L denotes an equivalent standard leak rate, $L_0$ denotes a minimum detectable leak rate of gross-leak test, $\tau_{He}$ denotes a helium gas exchange time constant, $\tau_{Hemin}$ denotes the minimum helium gas exchange time constant of an acceptable sealed component, and $\tau_{He0}$ denotes a helium gas exchange time constant for gross leak, $$\tau_{He0} = \frac{VP_0}{L_0}\sqrt{\frac{M_{He}}{M_A}}$$

where, V denotes the cavity volume of a component under test, $P_0$ denotes standard atmospheric pressure, $M_{He}$ denotes the molecular weight of helium gas in grams, and $M_A$ denotes the mean molecular weight of air in grams:

$$t_{3max} = \frac{\tau_{Hemin}\tau_{He0}}{\tau_{Hemin} - \tau_{He0}}\ln\left(\frac{\tau_{Hemin}}{\tau_{He0}}\right); \quad (3)$$

$t_{3max}$ also should conforms to formula (4):

$$t_{3max} \leq \frac{1}{10}\tau_{Hemin} \quad (4);$$

(S42) the leak detector detects the actually measured leak rate $R_t$ of the component under test, and the judging unit judges whether the time taken by the leak detector to detect the component under test reaches the preset time $t_0$, or whether the actually measured leak rate $R_t$ as detected is less than or equal to a criterion $R_{2max}$ for measured leak rate, and then the actually measured leak rate $R_t$ is red from the leak detector either the time taken by the leak detector to detect the component under test reaches the preset time $t_0$ or the actually measured leak rate $R_t$ as detected is less than or equal to a criterion $R_{2max}$ for measured leak rate;

wherein the preset time $t_0$ is determined in such a manner that: the time in which the leak test system ensures that the background value is no larger than 1/5 of the criterion for measured leak rate, which is determined by a load-free test on the detecting chamber, is taken as the preset time $t_0$, i.e. the time when the detector reads the actually measured leak rate $R_t$ of the component under test;

(S43) the judging unit judges whether the larger one of the background value of the leak test system and the absorption leak rate of the component under test is larger than 1/5 of the acceptable criterion $R_{2max}$ for measured leak rate; if not, the actually measured leak rate $R_t$ in Step S42 is regarded as the measured leak rate $R_2$ of the component under test; and if the absorption leak rate is larger than 1/5 of $R_{2max}$, the actually measured leak rate $R_t$ subtracted by the absorption leak rate is regarded as the measured leak rate $R_2$ of the component under test; and (S44) the judging unit judges whether the sealability of the component under test is acceptable according to the measured leak rate $R_2$ in Step S43, comprising the following steps (S441) and (S442):

(S441): judging, by the judging unit, whether the measured leak rate $R_2$ of the component under test is larger than the criterion $R_{2max}$ for measured leak rate; when the measured leak rate $R_2$ is larger than the criterion $R_{2max}$, the sealability of the component under test is judged as failed; and when the measured leak rate $R_2$ of the component under test is equal to or less than the criterion $R_{2max}$, Step S442 is performed; and (S442): carrying out a gross-leak test with the minimum detectable leak rate $L_0$ of 1.0 Pa·cm³/s; if the component does not pass the gross-leak test, the sealability of the component under test is judged as failed; and if the component passes the gross-leak test, the sealability of the component under test is judged as acceptable;

where, a rigour grade $\tau_{Hemin}$ is taken as a basic criterion for helium mass spectrometric fine-leak test, and the criterion $R_{2max}$ for measured leak rate is calculated from $\tau_{Hemin}$;

$R_{2max}$ is obtained via formula (7) in a condition of actual test-waiting time $t_3 \leq t_{3max}$, $$R_{2max} = \frac{VkP_0}{\tau_{Hemin}} \qquad (7)$$

where, V denotes a minimum cavity volume in a cavity volume section of the fixed scheme, and a group of values of $R_{2max}$ for the fixed scheme of the helium prefilling method is obtained via formula (7).

6. The method according to claim 5, where a step of (S2) effectively lengthening the total time for storage and test waiting is employed after the step of (S1) and before the step of (S3), comprising:

a gas mixture of a pressure of $(1.05\sim1.10)P_0$ is filled into the sealed component under test according to a determined ratio of prefilled helium k, partial components waiting for test are stored in a helium prefilling device or a storage tank with an atmosphere the same as the prefilled gas mixture including helium for storage time not exceeding the rigour grade $\tau_{Hemin}$, where k denotes a ratio of the partial pressure of helium gas in the prefilled gas mixture of nitrogen and helium to $P_0$; and the maximum test-waiting time $t_{3max}$ starts from the ending of the storage and is calculated according to formula (3).

7. A method for detecting sealability of a sealed electronic component, which applies a helium mass spectrometric fine-leak test based on a quantitative determination of a maximum test-waiting time $t_{max}$ to provide a stricter criterion with respect to sealability, for classifying the sealability, and for extending the reliable storage life of the sealed electronic component, comprising the following steps (S1), (S3), and (S4):

(S1) a component under test is put into a helium pressurizing tank vacuumed to below 100 Pa; then, helium gas is filled into the helium pressurizing tank within 20 seconds with maintaining a pressure of pressurizing helium $P_E$ for time $t_1$;

(S3) the surficially absorbed helium of the component under test is removed after the above storage or helium pressurizing during subsequent storage; wherein no direct or potential damage should be made on the component under test during the removing process; and the time used for the removing process should guarantee that the test of the component is completed within time $t_{2max}$ and wherein the additional leak rate caused by the surficially absorbed helium of the component under test after the above removal, i.e., the absorption leak rate, should be no larger than 1/5 of the criterion for measured leak rate; and (S4) detecting and judging: the leak detector detects the actually measured leak rate $R_t$ of the component under test, gives the measured leak rate $R_2$ of the component, and determines whether the sealability of the component is acceptable, comprising the following steps (S41)-(S44):

(S41) judging, by a judging unit, whether a test-waiting time in which a component under test waits for test in the air is no longer than the maximum test-waiting time $t_{max}$ determined quantitatively, where a fixed scheme of helium mass spectrometric fine-leak test based on the helium-prefilling method is employed, and the maximum test-waiting time $t_{max}$ is $t_{3max}$; when $\tau_{Hemin} > \tau_{He0}$, $t_{3max}$ is obtained by formula (3) in conditions of $L=L_0$ and $\tau_{He}=\tau_{He0}$, where L denotes an equivalent standard leak rate, $L_0$ denotes a minimum detectable leak rate of gross-leak test, $\tau_{He}$ denotes a helium gas exchange time constant, $\tau_{Hemin}$ denotes the minimum helium gas exchange time constant of an acceptable sealed component, and $\tau_{He0}$ denotes a helium gas exchange time constant for gross leak, $$\tau_{He0} = \frac{VP_0}{L_0}\sqrt{\frac{M_{He}}{M_A}}$$

where, V denotes the cavity volume of a component under test, $P_0$ denotes standard atmospheric pressure, $M_{He}$ denotes the molecular weight of helium gas in grams, and $M_A$ denotes the mean molecular weight of air in grams:

$$t_{3max} = \frac{\tau_{Hemin}\tau_{He0}}{\tau_{Hemin} - \tau_{He0}}\ln\left(\frac{\tau_{Hemin}}{\tau_{He0}}\right) \quad (3)$$

(S42) the leak detector detects the actually measured leak rate $R_1$ of the component under test, and the judging unit judges whether the time taken by the leak detector to detect the component under test reaches the preset time $t_0$, or whether the actually measured leak rate $R_t$ as detected is less than or equal to a criterion $R_{2max}$ for measured leak rate, and then the actually measured leak rate $R_t$ is red from the leak detector either the time taken by the leak detector to detect the component under test reaches the preset time $t_0$ or the actually measured leak rate $R_t$ as detected is less than or equal to a criterion $R_{2max}$ for measured leak rate;

wherein the preset time $t_0$ is determined in such a manner that: the time in which the leak test system ensures that the background value is no larger than ⅕ of the criterion for measured leak rate, which is determined by a load-free test on the detecting chamber, is taken as the preset time $t_0$, i.e. the time when the detector reads the actually measured leak rate $R_t$ of the component under test;

(S43) the judging unit judges whether the larger one of the background value of the leak test system and the absorption leak rate of the component under test is larger than ⅕ of the acceptable criterion $R_{2max}$ for measured leak rate; if not, the actually measured leak rate $R_t$ in Step S42 is regarded as the measured leak rate $R_2$ of the component under test; and if the absorption leak rate is larger than ⅕ of $R_{2max}$, the actually measured leak rate $R_t$ subtracted by the absorption leak rate is regarded as the measured leak rate $R_2$ of the component under test; and (S44) the judging unit judges whether the sealability of the component under test is acceptable according to the measured leak rate $R_2$ in Step S43, comprising the following steps (S441) and (S442):

(S441): judging, by the judging unit, whether the measured leak rate $R_2$ of the component under test is larger than the criterion $R_{2max}$ for measured leak rate; when the measured leak rate $R_2$ is larger than the criterion $R_{2max}$, the sealability of the component under test is judged as failed; and when the measured leak rate $R_2$ of the component under test is equal to or less than the criterion $R_{2max}$, Step S442 is performed; and (S442): carrying out a gross-leak test with the minimum detectable leak rate $L_0$ of 1.0 Pa·cm³/s; if the component does not pass the gross-leak test, the sealability of the component under test is judged as failed; and if the component passes the gross-leak test, the sealability of the component under test is judged as acceptable;

where, a rigour grade $\tau_{Hemin}$ is taken as a basic criterion for helium mass spectrometric fine-leak test, and the criterion $R_{2max}$ for measured leak rate is calculated from $\tau_{Hemin}$;

$R_{2max}$ is obtained via formula (8):

$$R_{2max} = \frac{VkP_0}{\tau_{Hemin}}\exp\left(-\frac{t_3}{\tau_{Hemin}}\right) \quad (8)$$

where, V denotes the cavity volume of the component under test, k denotes a ratio of the partial pressure of helium gas in the prefilled gas mixture of nitrogen and helium to $P_0$, and $t_3$ denotes the actual test-waiting time, which should be no longer than $t_{3max}$ specified in formula (3).

8. A method according to claim 7, where a step of (S2) effectively lengthening the total time for storage and test waiting is employed after the step of (S1) and before the step of (S3), comprising:

a gas mixture of a pressure of $(1.05-1.10)P_0$ is filled into the sealed component under test according to a determined ratio of prefilled helium k, partial components waiting for test are stored in a helium prefilling device or a storage tank with an atmosphere the same as the prefilled gas mixture including helium for storage time not exceeding the rigour grade $\tau_{Hemin}$, where k denotes a ratio of the partial pressure of helium gas in the prefilled gas mixture of nitrogen and helium to $P_0$; and the maximum test-waiting time $t_{3max}$ starts from the ending of the storage and is calculated according to formula (3).

* * * * *